(12) United States Patent
Miyoshi et al.

(10) Patent No.: US 7,856,064 B2
(45) Date of Patent: Dec. 21, 2010

(54) OFDM COMMUNICATION APPARATUS AND OFDM COMMUNICATION METHOD

(75) Inventors: Kenichi Miyoshi, Kanagawa (JP); Akihiko Nishio, Kanagawa (JP); Isamu Yoshii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 698 days.

(21) Appl. No.: 11/722,827

(22) PCT Filed: Dec. 26, 2005

(86) PCT No.: PCT/JP2005/023804

§ 371 (c)(1), (2), (4) Date: Jun. 26, 2007

(87) PCT Pub. No.: WO2006/070753

PCT Pub. Date: Jul. 6, 2006

(65) Prior Publication Data

US 2008/0144729 A1    Jun. 19, 2008

(30) Foreign Application Priority Data

Dec. 28, 2004  (JP) ............... 2004-379653

(51) Int. Cl.
*H04K 1/10* (2006.01)
(52) U.S. Cl. .................................. 375/260
(58) Field of Classification Search ............ 375/260; 714/822
See application file for complete search history.

(56) References Cited

U.S. PATENT DOCUMENTS

| 6,751,772 B1 | 6/2004 | Kim |
| 2003/0021240 A1 | 1/2003 | Moon |
| 2003/0171121 A1 | 9/2003 | Kim et al. |
| 2005/0110286 A1 * | 5/2005 | Zhang ............... 293/154 |
| 2005/0208906 A1 | 9/2005 | Miyoshi et al. |

FOREIGN PATENT DOCUMENTS

| JP | 2003-503952 | 1/2003 |
| JP | 2003-134180 | 5/2003 |
| JP | 2003 188856 | 7/2003 |
| JP | 2004 129249 | 4/2004 |

(Continued)

OTHER PUBLICATIONS

PCT International Search Report dated Feb. 21, 2006.

(Continued)

*Primary Examiner*—Kevin Y Kim
(74) *Attorney, Agent, or Firm*—Dickinson Wright PLLC

(57) ABSTRACT

An OFDM communication apparatus that can set an optimum repetition number to data to be transmitted, thereby improving the error rate characteristic and hence the communication quality. In this apparatus, a repetition number deciding part (153) decides, based on quality information outputted from a quality information extracting part (152), a required repetition number. A systematic bit repetition number deciding part (154) decides, based on the repetition number notified of by the repetition number deciding part (153), an optimum repetition number for the systematic bit. A parity bit repetition number deciding part (155) operates similarly. Repetition parts (103-1, 103-2) repeat the bits in accordance with instructions from the systematic bit repetition number deciding part (154) and from the parity bit repetition number deciding part (155).

9 Claims, 6 Drawing Sheets

FOREIGN PATENT DOCUMENTS

| | | |
|---|---|---|
| JP | 2004 147068 | 5/2004 |
| JP | 2004-266739 | 9/2004 |

OTHER PUBLICATIONS

Noriyuki Maedia, et al.; "Kudari Link Broad band Channel ni Okeru OFCDM to OFDM no Tokusei Hikaku," Denshi Joho Tsushin Gakkai Gijutsu Kenkyu Hokohu RCS2002-162, Aug. 23, 2002, pp. 95-100.

Ngajikin N., et al.; PAPR reduction in WLAN-OFDM System using code repetition technique, Research and Development, 2003, Scored 2003, Proceedings, Student Conference on Aug. 26, 2003, pp. 85-89.

Notice for Reasons for Rejection on corresponding Japanese Patent Application dated Aug. 18, 2009.

\* cited by examiner

OFDM COMMUNICATION APPARATUS AND OFDM COMMUNICATION METHOD

TECHNICAL FIELD

The present invention relates to an OFDM communication apparatus and an OFDM communication method that perform communication using an OFDM (Orthogonal Frequency Division Multiplexing) scheme.

BACKGROUND ART

In recent years, in mobile communication, various kinds of information such as images and data other than speech have become targets of transmission. In association with this, the need for highly reliable and high-speed transmission has further increased. However, when high-speed transmission is carried out in mobile communication, the influence of delayed waves due to multipath cannot be ignored, and transmission characteristics deteriorate due to frequency selective fading.

Multicarrier communication typified by an OFDM (Orthogonal Frequency Division Multiplexing) scheme is attracting attention as one of techniques for combating frequency selective fading. Multicarrier communication is a technique for performing high-speed transmission by transmitting data using a plurality of subcarriers whose transmission rate is suppressed to the degree where frequency selective phasing does not occur. Particularly, in the OFDM scheme, the frequencies of a plurality of subcarriers where data are arranged are orthogonal each other, and therefore this scheme provides highest spectrum efficiency use in multicarrier communication and can be implemented using a relatively simple hardware configuration. Therefore, the OFDM scheme attracts attention as a candidate for a communication scheme adopted in the fourth generation mobile communication, and various studies have been undertaken.

Further, in the OFDM scheme, as an additional reception error countermeasure, there is a technique of duplicating (repeating) the same data symbol to obtain a plurality of symbols, mapping these symbols in a plurality of subcarriers, that is, arranging a plurality of the same data in the frequency domain and then performing transmission (see, for example, Non-patent Document 1). In an OFDM communication apparatus that adopts this technique, when the number of repetitions (the number of duplicates) is RF (Repetition Factor), each of the transmission symbols is copied in the number of RFs, and the symbols are arranged on the frequency domain and transmitted. This RF may be defined as a parameter corresponding to a spreading factor of the CDMA scheme.
Non-patent Document 1: Maeda, Atarashi, Kishiyama, Sawahashi, "Performance Comparisons between OFCDM and OFDM in a Forward Link Broadband Channel," Technical Report RCS2002-162 of IEICE, August 2002

DISCLOSURE OF INVENTION

Problems to be Solved by the Invention

However, with the OFDM communication apparatus described above, there is room for improving communication performance. This is because RF is fixed in all symbols of one frame in the above OFDM communication apparatus. For example, FIG. 1 shows an example of the frame format of a signal transmitted from the above OFDM communication apparatus. As can be understood from the figure, all data symbols S1 to S6 are repeated based on the number of repetitions RF=4 and then arranged in the subcarrier direction (frequency domain). This repetition method causes a decrease in performance as described below.

For example, when channel coding is performed by turbo coding on transmission data, interesting characteristics such as those shown in FIG. 2 appear. This figure shows the simulation result of error rate characteristics for the case where the numbers of repetitions of the systematic bit and parity bit are changed. Here, the horizontal axis indicates a ratio of the number of parity bits and the number of systematic bits (P/S ratio).

As can be understood from the figure, on the error rate characteristics curve for the case where the numbers of repetitions of the systematic bit and parity bit are changed, there exists a minimum point. However, when the numbers of repetitions of both systematic bits and parity bits are fixed to the same number as in the case of the OFDM communication apparatus described above (P/S ratio in figure: 4/4), the error rate is far from the minimum point, and therefore communication performance deteriorates as a result. On the other hand, it is clear that an error rate close to the minimum point can be realized if a P/S ratio of 3/5 is achieved. Therefore, it is clear that implementing a repetition method that exhibits an error rate close to the above-described minimum point leads to better error rate characteristics and improves the communication performance of the OFDM communication apparatus.

The error rate characteristics improves by setting the number of repetitions of the systematic bits and parity bits as described above because systematic bits have a greater influence of the likelihood than parity bits in channel coding. Therefore, error rate characteristics are improved by improving the quality of systematic bits to a greater degree than the quality of parity bits.

It is therefore an object of the present invention to provide an OFDM communication apparatus and an OFDM communication method that enable the setting of the optimal number of repetitions for transmission data, and thereby capable of improving error rate characteristics as well as communication quality.

Means for Solving the Problem

The OFDM communication apparatus of the present invention adopts a configuration having: a setting section that sets the number of repetitions of transmission data according to the type of the transmission data: and a transmission section that repeats the transmission data based on the number of repetitions and transmits the transmission data.

Further, in the configuration described above, the transmission data is channel coded and includes data having larger contribution to error correction capability and data having smaller contribution to error correction capability, and the setting section sets the larger number of repetitions of the data having larger contribution to error correction capability than the number of repetitions of the data having smaller contribution to error correction capability.

For example, when the channel coding is turbo coding, data having larger contribution to error correction capability is a systematic bit, and data having smaller contribution to error correction capability is a parity bit.

ADVANTAGEOUS EFFECT OF THE INVENTION

According to the present invention, it is possible to set the optimum number of repetitions for transmission data, and thereby improve error rate characteristics as well as communication quality.

BEST MODE FOR CARRYING OUT THE INVENTION

Embodiments of the present invention will now be described in detail with reference to the accompanying drawings.

Embodiment 1

Figure 3:
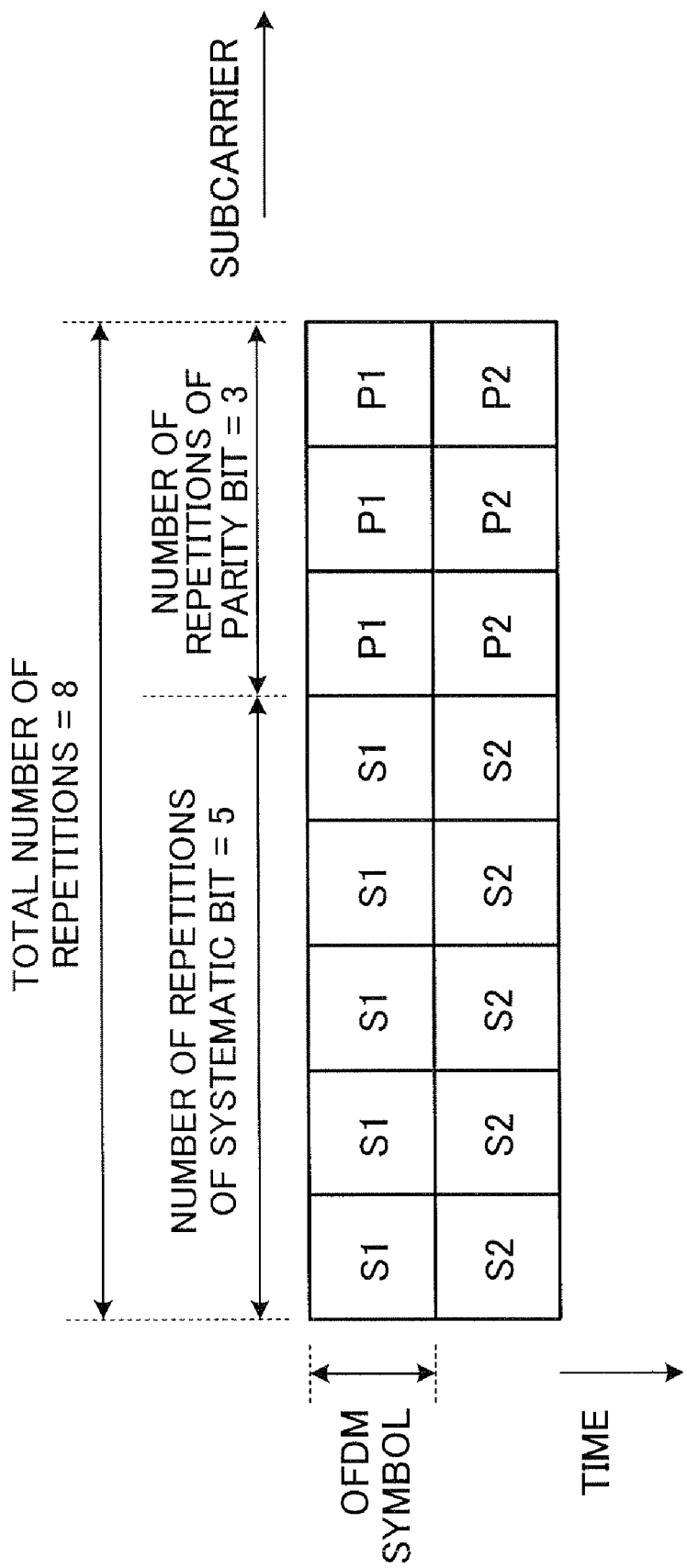
FIG. 3 shows an example of a format of a signal transmitted from an OFDM communication apparatus according to Embodiment 1.

FIG. 3 shows an example of the format of the signal transmitted from the OFDM communication apparatus according to Embodiment 1 of the present invention.

Figure 1:
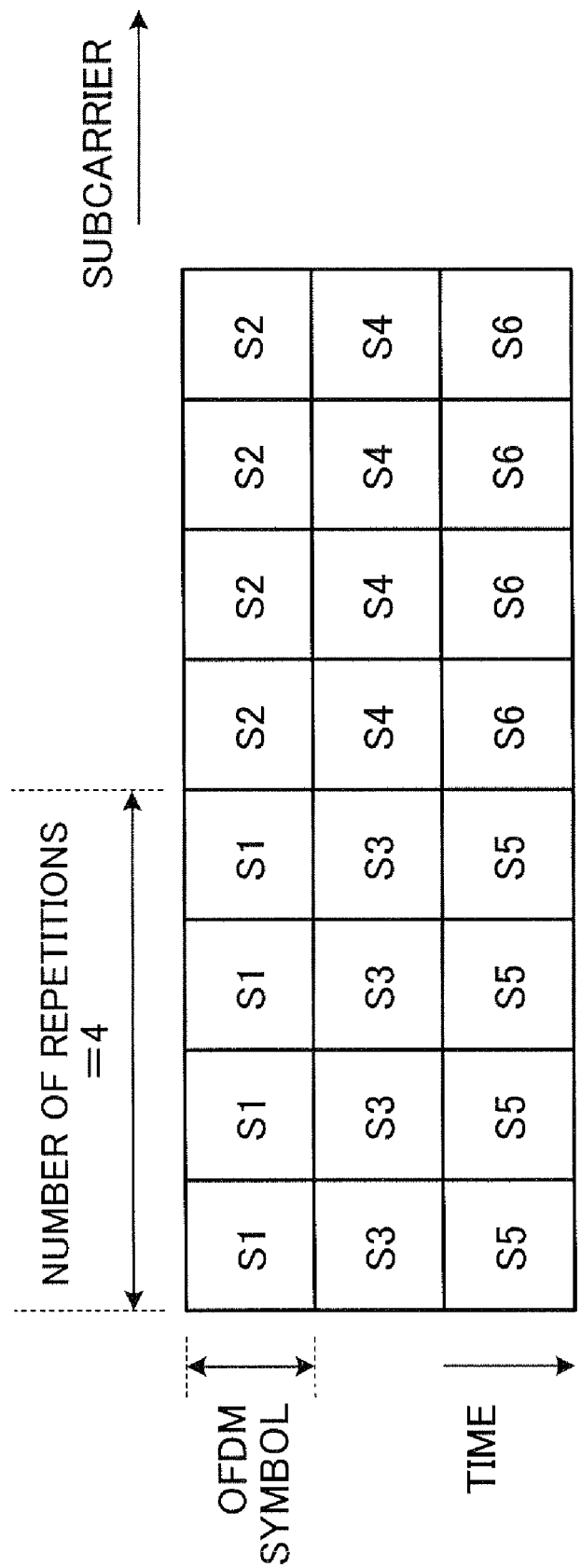
FIG. 1 shows an example of a frame format of a transmission signal.
Figure 2:
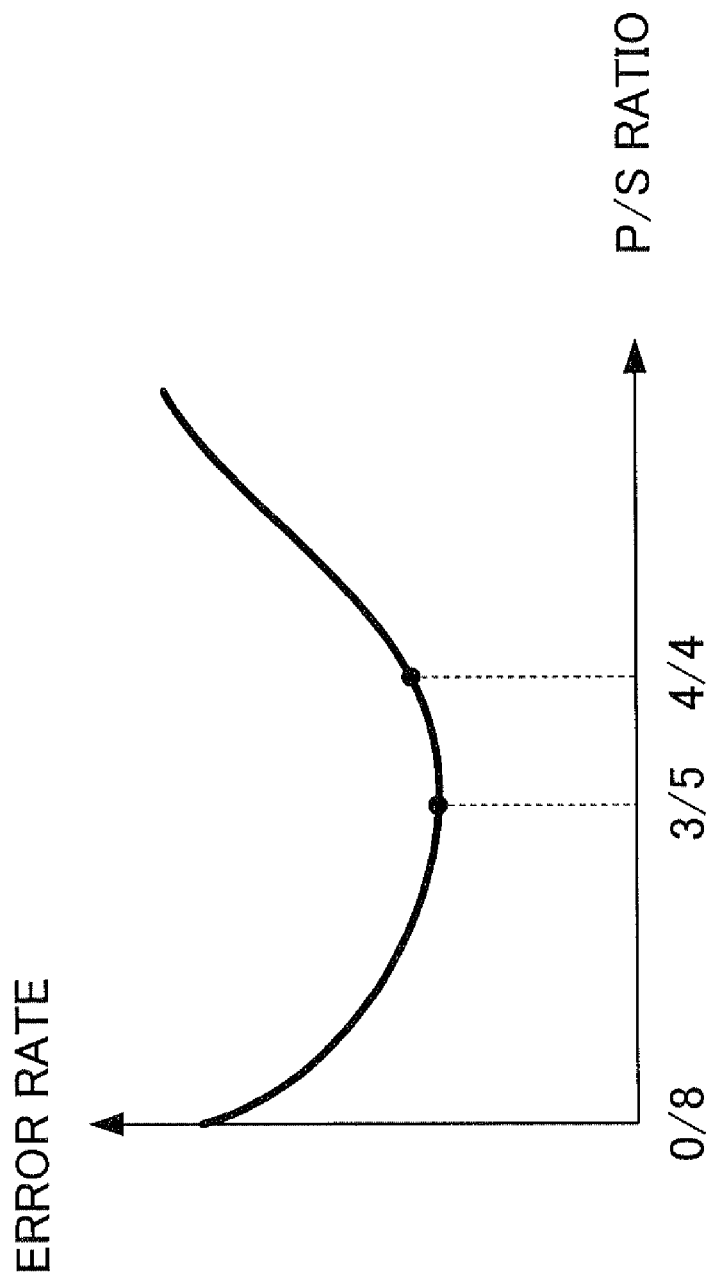
FIG. 2 shows the simulation result for the case where the numbers of repetitions of the systematic bit and parity bit are changed.

When the error rate characteristics are as shown in FIG. 2, error rate characteristics can be improved by setting the P/S ratio to 3/5 as previously described. Here, in this embodiment, the number of repetitions of the systematic bit is set to five and the number of repetitions of the parity bit is set to three. Now, the configuration of the OFDM communication apparatus that generates a transmission signal of this format will be described.

Figure 4:
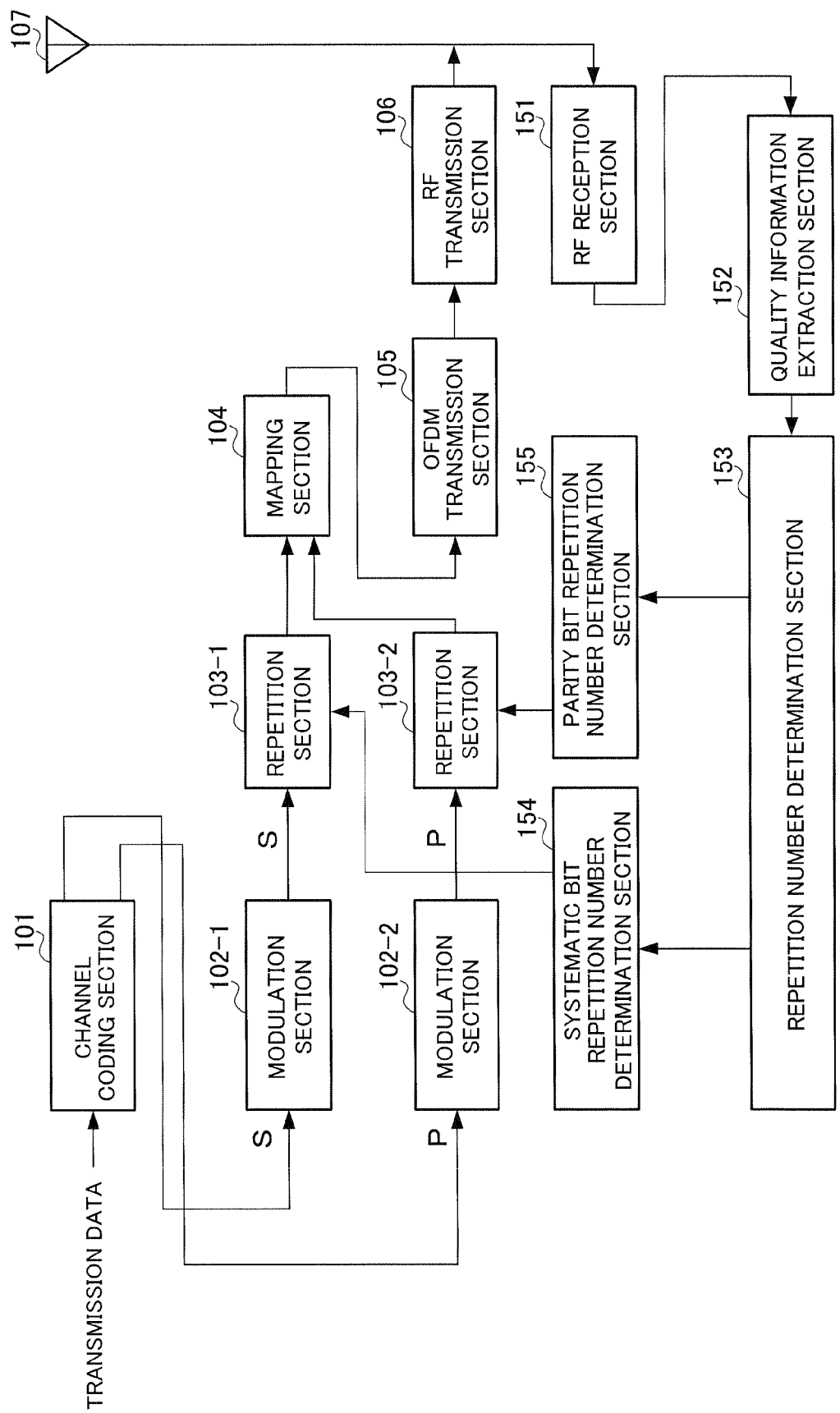
FIG. 4 is a block diagram showing the main configuration of an OFDM communication apparatus according to Embodiment 1.

FIG. 4 is a block diagram showing the main configuration of the OFDM communication apparatus according to this embodiment. Herein, the case will be described as an example where turbo coding is adopted as channel coding, and BPSK (Binary Phase Shift Keying) is adopted as a modulation scheme.

The OFDM communication apparatus according to this embodiment is roughly configured with a transmission system and a reception system, wherein the transmission system has channel coding section 101, modulation section 102, repetition section 103, mapping section 104, OFDM transmission section 105 and RF (Radio Frequency) transmission section 106, and the reception system has RF reception section 151, quality information extraction section 152, repetition number determination section 153, systematic bit repetition number determination section 154 and parity bit repetition number determination section 155. In addition, the transmission system and the reception system share antenna 107.

First, the transmission system of the OFDM communication apparatus described above will be described.

Channel coding section 101 performs channel coding on the information bits of the transmission data by turbo coding, and outputs the generated systematic bit S and parity bit P to modulation sections 102-1 and 102-2, respectively.

Modulation section 102-1 performs modulation processing using the BPSK scheme on the systematic bit S outputted from channel coding section 101, and outputs the modulated systematic bit S to repetition section 103-1. Similarly, modulation section 102-2 performs modulation processing using the BPSK scheme on the parity bit P outputted from channel coding section 101, and outputs the modulated parity bit P to repetition section 103-2.

Repetition section 103-1 repeats systematic bit S a predetermined number of times and outputs the result to mapping section 104 according to the instruction from systematic bit repetition number determination section 154. Specifically, repetition section 103-1 generates duplicates of modulated systematic bit S outputted from modulation section 102-1 in the number of repetitions indicated from systematic bit repetition number determination section 154, and outputs the result to mapping section 104. Similarly, repetition section 103-2 repeats parity bit P a predetermined number of times and outputs the result to mapping section 104 according to the instruction of parity bit repetition number determination section 155.

Mapping section 104 maps (superimposes) duplicated symbols outputted from repetition sections 103-1 and 103-2 on a plurality of subcarriers arranged in the two-dimensional directions of a time domain and frequency domain, and outputs the result to OFDM transmission section 105.

OFDM transmission section 105 performs OFDM transmission processing such as Inverse Fast Fourier Transform (IFFT) and guard interval addition processing on the transmission symbols mapped on the subcarriers, and outputs the result to RF transmission section 106.

RF transmission section 106 performs predetermined radio processing such as D/A conversion and up-conversion on the signal outputted from OFDM transmission section 105, and radio transmits the result via antenna 107.

Next, the reception system of the OFDM communication apparatus according to this embodiment will be described. The reception processing described herein is not normal reception processing, that is, is not intended to obtain reception data, but rather determines the number of repetitions used in the repetition processing performed in the transmission processing described above. The configuration and a description of the normal reception processing of the OFDM communication apparatus according to this embodiment will be omitted.

RF reception section 151 performs predetermined radio processing such as down-conversion and A/D conversion on the signal received via antenna 107, and outputs the obtained baseband signal to quality information extraction section 152.

Quality information extraction section 152 extracts the quality information from the baseband signal outputted from RF reception section 151, and reports the quality information to repetition number determination section 153. Here, the quality information is information relating to reception quality such as SIR (Signal to Interference Ratio), CIR (Carrier to Interference Ratio) and RSSI (Received Signal Strength Indicator) information observed in the OFDM communication apparatus of the communicating party.

Repetition number determination section 153 determines the required number of repetitions, that is, the number of repetitions of the transmission signal where the reception quality of the OFDM communication apparatus of the communicating party is a predetermined level or higher, based on the quality information outputted from quality information extraction section 152. The number of repetitions is reported to both systematic bit repetition number determination section 154 and parity bit repetition number determination section 155.

Systematic bit repetition number determination section 154 determines the optimum number of repetitions for the transmission data type (here, systematic bit) using the method described hereafter, based on the number of repetitions reported from repetition number determination section 153, and indicates the number to repetition section 103-1.

Similarly, parity bit repetition number determination section 155 determines the optimum number of repetitions for the transmission data type (here, parity bit) based on the method described hereafter, based on the number of repetitions reported from repetition number determination section 153, and indicates the number to repetition section 103-2.

Repetition section 103-1 and repetition section 103-2, as described above, repeat each bit only a predetermined number of times according to the instructions from systematic bit repetition number determination section 154 and parity bit repetition number determination section 155, and output the results to mapping section 104.

Next, the above method of determining the number of repetitions of each bit in systematic bit repetition number determination section 154 and parity bit repetition number determination section 155 will be described in detail.

Systematic bit repetition number determination section 154 and parity bit repetition number determination section 155 know in advance the P/S ratio that provides the best error rate characteristics. For example, when the error rate characteristics are as shown in FIG. 2, the optimum P/S ratio is 3/5. Here, when the number of repetitions that will bring the reception quality of the OFDM communication apparatus of the communicating party to a predetermined level or higher is reported to systematic bit repetition number determination section 154 and parity bit repetition number determination section 155 from repetition number determination section 153, systematic bit repetition number determination section 154 and parity bit repetition number determination section 155 determine the number of repetitions for the systematic bit and parity bit that will satisfy the number of repetitions as well as the P/S ratio described above. This number of repetitions is continually used until a new number of repetitions is reported from repetition number determination section 153.

More specifically, when the total number of repetitions of systematic bits and parity bits reported from repetition number determination section 153 is set to RF, and the number of repetitions of systematic bits is set to RFS, and the number of repetitions of parity bits is set to RFP, systematic bit repetition number determination section 154 and parity bit repetition number determination section 155 obtain RFS and RFP that satisfy both equations 1 and 2 below.

$$RF=(RFS+RFP)/2 \quad (1)$$

$$RFP/RFS=3/5 \quad (2)$$

As a specific example, for instance, when the number of repetitions reported from repetition number determination section 153 is 4 in a turbo code of R=½, systematic bit repetition number determination section 154 sets the systematic bit repetition number to 5, and parity bit repetition number determination section 155 sets the parity bit repetition number to 3. As a result, when both the systematic bit and parity bit are viewed in an average value, the number of repetitions is four and the numbers of repetitions of the systematic bit and parity bit are different from each other, and a P/S ratio is 3/5. Furthermore, the signal format already shown in FIG. 3 satisfies the conditions of this specific example.

Furthermore, there is no guarantee that solutions of equations 1 and 2 described above—RFP and RFS—will always be integer values. In this case, systematic bit repetition number determination section 154 and parity bit repetition number determination section 155 may obtain the number of repetitions that form a ratio closest to the optimum P/S ratio.

As described above, the OFDM communication apparatus according to this embodiment has systematic bit repetition number determination section 154 for determining the number of repetitions of the systematic bit, and parity bit repetition number determination section 155 for determining the number of repetitions of the parity bit. Thus, according to this embodiment, the numbers of repetitions of the systematic bit and parity bit can be separately set with respect to one another.

Further, the number of repetitions of the channel coded transmission signal can be varied according to the type and attributes of the transmission signal. That is, in this embodiment, turbo coding is used as channel coding, and therefore the number of repetitions is made different depending on whether the transmission bit corresponds to a systematic bit or a parity bit, in particular, the number of repetitions is set so that the number of repetitions of a systematic bit is larger than the number of repetitions of a parity bit. As a result, the number of repetitions of the systematic bit of the channel coded transmission signal increases compared to that of the parity bit, and therefore performance of channel coding—error correction capability—improves.

Further, in the above-described configuration, the average number of repetitions of both the systematic bit and parity bit is set to the number of repetitions where the reception quality of the OFDM communication apparatus of the communicating party is a predetermined level or higher. The error correction capability improves by increasing the number of repetitions of systematic bit or parity bit, but if the number of repetitions increases without limit, the transmission rate of the overall communication system decreases conversely. Here, in this embodiment, the total number of repetitions is fixed and the allocation of the limited number of repetitions between the systematic bit and parity bit is controlled.

As a result, even when the number of repetitions is changed between the systematic bit and parity bit, it is possible to improve error rate characteristics as well as communication quality while maintaining the number of bits of the repeated signal (the transmission rate of the channel coded transmission signal) to be a predetermined value.

Furthermore, in this embodiment, the case has been described as an example where the total number of repetitions is fixed at a value where the reception quality of the OFDM communication apparatus of the communicating party is a predetermined level or higher, and the ratio of the numbers of repetitions for the systematic bit and parity bit are changed. However, the total number of repetitions does not necessarily need to be fixed to the above-described value, and for example, when the minimum required numbers of repetitions of the systematic bit and parity bit are known, the number of repetitions may be set so as to ensure these values at least.

Further, in this embodiment, the case has been described as an example where turbo coding is adopted as channel coding, but the channel coding scheme is not limited to this, and other schemes may be used. In this case, as a standard for making the number of repetitions different according to data type, for example, by increasing the number of repetitions of the channel coded signal, a larger number of repetitions are allocated to data having larger correction capability (error correction capability) when error correction is performed. That is, the number of repetitions of each data may be determined taking into consideration the degree of contribution to error correction capability when channel coding is performed.

Furthermore, in this embodiment, the case has been described as an example where the transmission bits obtained by repeating the same data are arranged in series in the subcarrier direction (FIG. 3), but the bits may be arranged apart. For example, the repeated transmission signal may be arranged via an interleaver.

Further, in this embodiment, the case has been described as an example where the set number of repetitions is continuously used until a new number of repetitions is reported from repetition number determination section 153, that is, the number of repetitions remains constant in the OFDM symbols of a given period, but the number of repetitions may also be changed on a per OFDM symbol basis, for example.

Further, in this embodiment, the case has been described as an example where systematic bit repetition number determination section 154 and parity bit repetition number determination section 155 operate independently with respect to one another, but the following operation, for example, is also possible. That is, systematic bit repetition number determination section 154 may first determine the number of repetitions of the systematic bit that has a greater influence of the number of repetitions and reports the number to parity bit repetition number determination section 155, and then parity bit repetition number determination section 155 may subtract the number of repetitions of the systematic bit from the total number of repetitions and set the remainder as the number of repetitions of parity bit.

Embodiment 2

In Embodiment 1, the case has been described as an example where there is one type of parity bit. In this embodiment, application of the present invention to a case where a plurality of parity bit types exist will be described.

Furthermore, the configuration of the OFDM communication apparatus according to this embodiment is basically the same as the configuration of the OFDM communication apparatus according to Embodiment 1 and descriptions thereof will be omitted.

Figure 5:
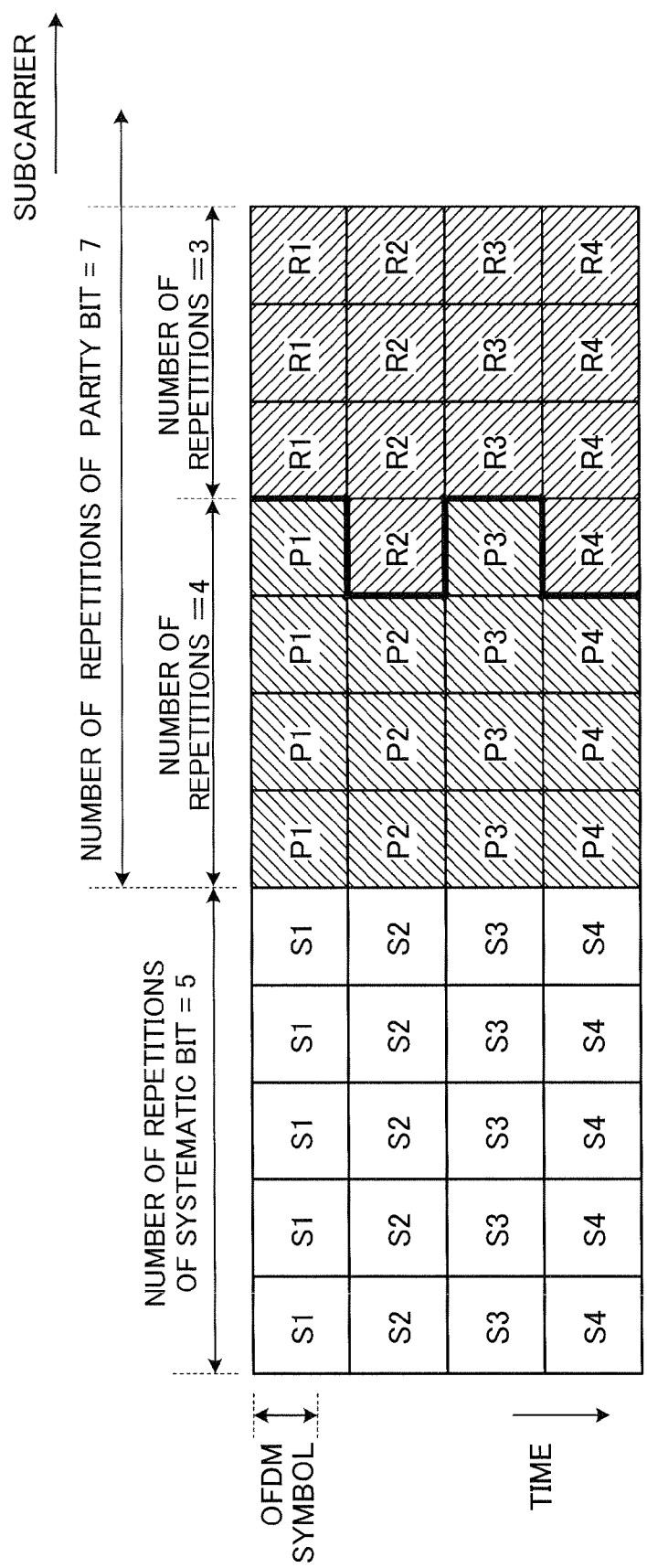
FIG. 5 shows a format of a transmission signal based on a repetition method according to Embodiment 2.

FIG. 5 shows a format of a transmission signal based on a repetition method according to this embodiment. Here, a case will be described as an example where two parity bit types P and R exist.

As shown in this figure, under the condition that number of repetitions RF is four, when systematic bit repetition number determination section 154 sets the number of repetitions of the systematic bit to five, the number of subcarriers that can be used by the repeated signal of P and R is seven. This value is not divisible by two, parity bit repetition number determination section 155 cannot allocate the same number of repetitions to P and R as is. Here, in this embodiment, the numbers of repetitions of P and R are alternately changed and set per OFDM symbol. That is, when P is set to three and R is set to four in a given OFDM symbol, P is set to four and R is set to three in the next OFDM symbol.

As a result, when the numbers of repetitions of P and R are averaged with two OFDM symbols, the averages are both 3.5. Therefore, it is possible to maintain the same number of repetitions between P and R.

Furthermore, in this embodiment, the case has been described as an example where two types of parity bits, P and R, exist, but the basic operation is the same even when three or more parity bit types exist. For example, when three parity bit types exist and the number of subcarriers that can be used for parity bit repetition is not divisible by three, three types of numbers of repetitions may be set and separately used per OFDM symbol so as to be used equally as a result. At this time, control is performed so that the average value of the numbers of repetitions of three or more OFDM symbols becomes the desired value.

Further, in this embodiment, the case has been described as an example where the data that sets a plurality of numbers of repetitions is a parity bit, but the data that sets a plurality of number of repetitions may be data other than parity bits.

Embodiment 3

In Embodiment 1, the case has been described as an example where the modulation scheme is BPSK. In this embodiment, a case will be described where the M-ary number is two or more, that is, a case where a modulation scheme such as QPSK (Quadrature Phase Shift Keying), 16QAM (Quadrature Amplitude Modulation) and 64QAM formed with symbols of two bits or more is adopted.

The configuration of the OFDM communication apparatus according to this embodiment is basically the same as the configuration of the OFDM communication apparatus according to Embodiment 1 and descriptions thereof will be omitted.

Figure 6:
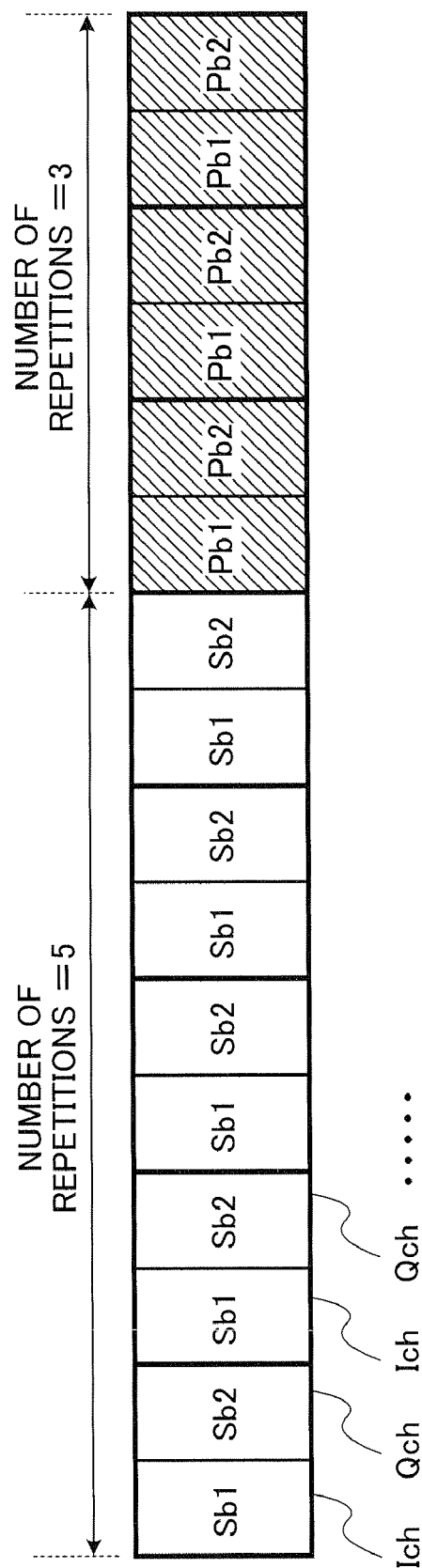
FIG. 6 shows a format of a transmission signal based on a repetition method according to Embodiment 3.

FIG. 6 shows a format of a transmission signal based on a repetition method according to this embodiment.

The OFDM communication apparatus according to this embodiment further has a bit interleaver, and, in the modulated OFDM signals arranged in two dimension, interleaving is performed so that only systematic bits or parity bits are arranged.

Specifically, as shown in FIG. 6, a symbol comprised of two bits has bit arrangement where the attributes of all bits contained in the symbol are the same. In other words, the bits are arranged so that bits of different attributes are not mixed together in one OFDM symbol. By this means, it is possible to always repeat the modulated signal and control the number of repetitions of systematic bit and the number of repetitions of parity bit separately, so that the configuration can be simplified and the circuit scale can be reduced.

Control is performed upon transmission of two bits of Ich and Qch so that the systematic and parity bits are not mixed in Ich and Qch in the QPSK modulated signal. By this means, the number of repetitions can be controlled in the modulated QPSK symbol, so that it is possible to simplify the circuit scale compared to the case where the number of repetitions is controlled based on bits before modulation. That is, when the number of bits that can be transmitted per one symbol is M, it is possible to set the scale of the repetition circuit to 1/M.

In this way, according to this embodiment, systematic and parity bits are not mixed together in one symbol. Thus, when the number of repetitions is made different between systematic bits and parity bits, it is only necessary to change the number of repetitions of the modulated symbol, so that it is possible to simplify the configuration and reduce the circuit scale.

This concludes the description of the embodiments of the present invention.

The OFDM communication apparatus and OFDM communication method according to the present invention are not limited to the above-described embodiments and can be implemented by making various modifications. For example, the embodiments can be appropriately combined and implemented.

Moreover, the OFDM communication apparatus according to the present invention may be implemented in a communication terminal apparatus and a base station apparatus in a mobile communication system, and it is thereby possible to provide a communication terminal apparatus, a base station apparatus and a mobile communication system having the same operation effects as described above.

Further, a base station may be indicated by "Node B," a mobile station by "UE," and a subcarrier by "Tone."

Here, the case has been described as an example where the present invention is configured with hardware, but the present invention can also be implemented as software. For example, by describing the OFDM communication method algorithm according to the present invention in a programming language, storing the program in memory, and making an information processing section execute the program, it is possible to implement the same function as that of the OFDM communication apparatus of the present invention.

The function blocks used in the descriptions of the above embodiments are typically implemented as LSIs, which are integrated circuits. These may be individual chips or may be partially or totally contained on a single chip.

Here, the term LSI has been used, but the terms IC, system LSI, super LSI, ultra LSI, and so forth may also be used according to differences in the degree of integration.

The method of implementing integrated circuitry is not limited to LSI, and implementation by means of dedicated circuitry or a general-purpose processor may also be used. After LSI manufacture, utilization of a programmable FPGA (Field Programmable Gate Array) or a reconfigurable processor in which connections and settings of circuit cells within an LSI can be reconfigured is also possible.

Furthermore, in the event of the introduction of an integrated circuit implementation technology whereby LSI is replaced by a different technology as an advance in, or derivation from, semiconductor technology, integration of the function blocks may of course be performed using that technology. Application in biotechnology is also possible.

The present application is based on Japanese Patent Application No. 2004-379653, filed on Dec. 28, 2004, the entire content of which is expressly incorporated by reference herein.

INDUSTRIAL APPLICABILITY

The OFDM communication apparatus and OFDM communication method according to the present invention can be applied to applications such as a communication terminal apparatus and a base station apparatus in a mobile communication system.

The invention claimed is:

1. An OFDM communication apparatus comprising:
   a setting section that sets a number of repetitions of data to be transmitted according to a type of the data to be transmitted, wherein the data to be transmitted is subjected to multilevel modulation; and
   a transmission section that repeats the modulated data based on the number of repetitions to generate the repeated transmission data, assigns the repeated transmission data to a plurality of subcarriers so that the data having a larger contribution to error correction capability and the data having a smaller contribution to error correction capability are not mixed in the plurality of subcarriers, and transmits the repeated transmission data on the plurality of subcarriers.

2. The OFDM communication apparatus according to claim 1, wherein:
   the data to be transmitted is channel coded and includes the data having the larger contribution to error correction capability and the data having the smaller contribution to error correction capability; and
   the setting section sets a larger number of repetitions for the data having the larger contribution to error correction capability than a number of repetitions for the data having the smaller contribution to error correction capability.

3. The OFDM communication apparatus according to claim 2, wherein:
   the channel coding is turbo coding;
   the data having the larger contribution to error correction capability is a systematic bit; and
   the data having the smaller contribution to error correction capability is a parity bit.

4. The OFDM communication apparatus according to claim 3, wherein the setting section sets the number of repetitions of the systematic bit and the number of repetitions of the parity bit based on a ratio of the systematic bit and the parity bit that maximizes error correction capability.

5. The OFDM communication apparatus according to claim 1, wherein the setting section sets the number of repetitions of each type of data to be transmitted so that a total number of repetitions of all the data to be transmitted becomes a predetermined value.

6. The OFDM communication apparatus according to claim 1, wherein the setting section sets a plurality of numbers of repetitions for specific data to be transmitted and uses the plurality of numbers of repetitions equally in a plurality of OFDM symbols.

7. A communication terminal apparatus comprising the OFDM communication apparatus according to claim 1.

8. A base station apparatus comprising the OFDM communication apparatus according to claim 1.

9. An OFDM communication method comprising:
   setting a number of repetitions of data to be transmitted according to a type of the data to be transmitted, wherein the data to be transmitted is subjected to multilevel modulation;
   repeating the modulated data based on the number of repetitions to generate the repeated transmission data;
   assigning the repeated transmission data to a plurality of subcarriers so that the data having a larger contribution to error correction capability and the data having a smaller contribution to error correction capability are not mixed in the plurality of subcarriers; and
   transmitting the repeated transmission data on the plurality of subcarriers.

* * * * *